US011967257B2

(12) United States Patent
Pomerantz

(10) Patent No.: US 11,967,257 B2
(45) Date of Patent: Apr. 23, 2024

(54) RETAIL SIGNAGE FIXTURE ATTACHMENT

(71) Applicant: Carl Pomerantz, Beaconsfield (CA)

(72) Inventor: Carl Pomerantz, Beaconsfield (CA)

( * ) Notice: Subject to any disclaimer, the term of this patent is extended or adjusted under 35 U.S.C. 154(b) by 45 days.

(21) Appl. No.: 17/844,147

(22) Filed: Jun. 20, 2022

(65) Prior Publication Data

US 2022/0406226 A1 Dec. 22, 2022

Related U.S. Application Data

(60) Provisional application No. 63/259,098, filed on Jun. 21, 2021.

(51) Int. Cl.
*G09F 7/18* (2006.01)
*G09F 3/20* (2006.01)

(52) U.S. Cl.
CPC ................ *G09F 7/18* (2013.01); *G09F 3/208* (2013.01); *G09F 2007/1843* (2013.01)

(58) Field of Classification Search
CPC ..... G09F 7/18; G09F 3/208; G09F 2007/1843
See application file for complete search history.

(56) References Cited

U.S. PATENT DOCUMENTS 1,360,229 A * 11/1920 Kolstad ..................... G09F 3/14 40/310
1,764,003 A * 6/1930 Bush ......................... G09F 3/14 40/306
1,830,410 A * 11/1931 Schaaf ................... A22C 17/10 427/256
1,910,751 A * 5/1933 Cobbs ....................... B60R 7/04 40/651
2,030,135 A * 2/1936 Carpenter ............... G09F 15/02 2/338
2,312,644 A * 3/1943 Horr ......................... G09F 1/04 40/787
3,015,898 A * 1/1962 Keeslar ..................... G09F 1/04 40/124.06
3,052,051 A * 9/1962 Ferguson, Jr. ............ G09F 3/14 40/662
3,174,232 A * 3/1965 Beanvais ................. G09B 1/06 402/19
3,742,632 A * 7/1973 Bollbach ................ B42D 15/04 40/538
4,384,418 A * 5/1983 Alley ...................... G09F 19/02 40/604

(Continued)

*Primary Examiner* — David R Dunn
*Assistant Examiner* — Christopher E Veraa

(57) ABSTRACT

The present invention is an improvement for retail customer experience. Stores that use an Electronic Shelf Label to displays a price (also known as ESL) need an apparatus to draw a customer's attention to products on sale or promoted. The invention is a flag for indicia that quickly attaches to ESLs with an elastic. The flag's indicia increases the ESL's visibility to shoppers and store personnel, and makes the product more noticeable. The flag can be made out of one piece of material or two, and can accommodate indicia. The flag can also incorporate a mechanical gripper to hold indicia. The flag can be installed or removed very simply with one hand, and self-adjusts to be congruent to the ESL, without any obstructions that would cause the flag to be dislodged by an accidental bump from a shopper or cart. The flag can be made of any printable material.

14 Claims, 13 Drawing Sheets

(56) References Cited

U.S. PATENT DOCUMENTS

| | | | | | |
|---|---|---|---|---|---|
| 4,918,848 | A * | 4/1990 | Stein | G09F 7/00 40/606.19 |
| 5,388,739 | A * | 2/1995 | Gargan | A45F 5/00 224/604 |
| 5,937,553 | A * | 8/1999 | Maran | G09F 1/06 40/124.14 |
| 5,946,839 | A * | 9/1999 | Odmark | A47F 5/0869 24/3.12 |
| D453,798 | S * | 2/2002 | Gray | D20/43 |
| 6,962,284 | B1 * | 11/2005 | Hartelius | H04N 1/00482 232/38 |
| 7,121,587 | B2 * | 10/2006 | Mark | A45F 5/12 403/220 |
| 8,356,436 | B2 * | 1/2013 | Horikiri | G09F 3/204 40/124.09 |
| 8,708,198 | B2 * | 4/2014 | Proper | B65D 55/04 340/572.1 |
| 9,373,273 | B2 * | 6/2016 | Engelby | G09F 3/203 |
| 9,640,093 | B1 * | 5/2017 | Severson, Jr. | G09F 7/18 |
| 10,529,257 | B1 * | 1/2020 | Peelgrane | G09F 3/02 |
| 10,889,501 | B2 * | 1/2021 | Chen | F24S 23/70 |
| D915,518 | S * | 4/2021 | White | A47F 5/0869 D20/43 |
| 11,475,801 | B2 * | 10/2022 | Konow | G09F 3/208 |
| 2004/0261302 | A1 * | 12/2004 | Carlin | G09F 7/00 40/492 |
| 2011/0123752 | A1 * | 5/2011 | Mellis | G09F 3/02 428/40.1 |
| 2011/0239509 | A1 * | 10/2011 | Horikiri | G09F 7/08 40/661.08 |
| 2011/0265359 | A1 * | 11/2011 | McNamee | G09F 19/12 40/594 |
| 2011/0290698 | A1 * | 12/2011 | Wilson | G09F 7/002 206/231 |
| 2012/0117838 | A1 * | 5/2012 | Riley | G09F 17/00 40/603 |
| 2015/0170550 | A1 * | 6/2015 | Jubro | G09F 3/208 40/662 |
| 2015/0371563 | A1 * | 12/2015 | Waugh | G09F 3/02 428/41.9 |
| 2016/0063901 | A1 * | 3/2016 | Joliey | G09F 3/204 40/5 |
| 2016/0104397 | A1 * | 4/2016 | Kim | G09F 3/208 40/5 |
| 2019/0012937 | A1 * | 1/2019 | Sundholm | G09F 3/204 |
| 2019/0080633 | A1 * | 3/2019 | Bottine | G09F 3/208 |
| 2021/0097897 | A1 * | 4/2021 | Sisko | A47F 5/0869 |
| 2021/0280092 | A1 * | 9/2021 | Sundholm | G08B 13/2434 |
| 2022/0406226 | A1 * | 12/2022 | Pomerantz | G09F 3/204 |

* cited by examiner

RETAIL SIGNAGE FIXTURE ATTACHMENT

This application claims the priority of U.S. Provisional Patent application No. 63/259,098, filed on Jun. 21, 2021.

In retail, items need to be priced so that shoppers/clients can be made aware of an item's price prior to purchase. Up until the latter part of the twentieth century, most retailers ticketed individual products with pricing. This was a clear way for customers to know pricing, but was very labor intensive for store personnel to do. It was also very complex to logistically control price changes.

Towards the end of the century, new merchandizing methods were developed so that ticketing individual items with pricing was replaced by placing a label or sticker on the shelf edge or merchandizing peg, so that all products behind or above the price ticket (commonly known as a bin ticket) had the ticketed price. This change represented a major labor savings to the retailer.

With advancements in technology at the end of the century, it has become possible to replace these formerly paper, cardstock, or stickered price labels, with Electronic Shelf Labels (commonly referred to as "ESL").

BACKGROUND

ESL systems provide for significant operational labor savings to the retailer. Among the advantages are that, with traditional paper bin tickets, every time a price change occurs, there is data entry to register the price change, plus new bin tickets have to be printed, sorted, old tickets removed, and new tickets inserted. Labor time involved, on average, is estimated at several minutes per label price change.

With ESLs, price changes can be wirelessly conducted, and can be automatically updated and changed. Furthermore, the ESL labels themselves can also indicate additional data beyond price, such as inventory information. Accuracy of information is improved. Within seconds, prices can be updated across multiple systems, so pricing can quickly be changed to stay competitive and match the competition.

This innovation yields improved productivity, price optimization, and price agility. A further benefit and goal are improved promotional opportunities, and better communication with shoppers.

For example, if a retailer has items they want to feature for Sale or Clearance, they can centrally alter all pricing for these items. Some ESLs further allow the face of the tag itself to change color and add electronic graphics in an attempt to more strongly signal, differentiate and highlight these specials to customers.

A shortcoming of this system is that digital highlighting of the tag's screen is often not conspicuous enough to sufficiently flag and alert a shopper to the item's Special or altered status. As the driving force behind justifying the high initial capital cost of an ESL system is its labor savings, a rapid method is needed for the retailer to be able to conspicuously flag desired items in a cost-effective way, while ensuring that store labor costs are kept to a minimum.

The present invention is an assembly with attachment means that allows the retailer to flag and to ultimately unflag desired items in a labor-efficient fashion. The invention has features such that it can be mounted and detached rapidly with one hand for optimum speed or placement. Furthermore, it features a discreet attachment means so that there is no upper signholder edge that will obstruct or be hit by product being taken off the shelf. The invention is self-centering and self-orientation correcting if accidentally hit while in use.

Furthermore, the elastic attachment means gives the holder firm staying power against accidental dislodgement by customers or store personnel. The attachment means also provides for rapid removal of the invention when desired.

The attachment means can adapt to multiple sized ESLs. Also, its features provide for it being able to be positioned either below or above the ESL. It can also be adapted so that it is positionable on the side of the ESL.

A typical example that illustrates the invention's unique benefits would be if a retailer wishes to flag all Sale items for a weekly Sales special. Ideally before store opening, the retailer can centrally alter the ESL pricing on all items to be on Sale. Then, with a push of one button, they can have all Sale items' ESLs flash. An employee can then rapidly tour the store and quickly place the invention, with a Sales sign, on all flashing ESLs. Flashing is then turned off, and all Sales ESLs have been flagged. In a similar fashion, at the end of the sales event period, sales items where Sales signs should now be removed, can be made to flash, and the sales signs can be quickly removed.

There is known U.S. Pat. No. 9,373,273. It engages the ESL by two tongues that slide behind the ESL. This geometry makes placing the sign slow and labor-intensive to put in place, and also slow to remove. It also takes both hands to engage and disengage. It also only fits one specific size of ESL. Furthermore, when in place, the prior art necessitates having an upper border that obstructs and interferes when a product is pulled forward from behind and above.

There is also known U.S. Pat. No. 8,356,436 for "INFORMATION DISPLAY PANEL AND ELECTRONIC SHELF LABEL" that slides into a through-hole portion of the shelf label. Installation of this invention is more time-consuming and labor-intensive as the store employee has to align the label with a narrow slit in the shelf label.

OBJECT OF THE PRESENT INVENTION

The present invention improves visibility of promotional items in the retail environment. A customer will be able to identify items on Sale or Discount quickly and easily because the present invention displays eye-catching indicia to visually guide them to the desired item. The present invention can also be used to relay internal information to the store staff such as inventory order status or if a product is out of stock. The present invention can be simply and rapidly installed by a store's staff with one hand, and does not require any training.

In the preferred embodiment, the invention consists of tab-like attachment means that includes two elongations that serve to contour to the rear sides of the ESL, joined together by a flexible tie or elastic. As a result of this unique geometry, the elastic can be easily manipulated and looped over the top and side edges of the ESL, and then the upper contour edge of the tab will be automatically pulled in to rest on the shoulder of the ESL's rear bottom edge. Conversely, the same result can be achieved to attach to the rear top edge of the ESL, so that the invention sits atop the ESL.

This tab-like attachment means can feature an adhesive zone so that a sign-holder or gripper can be attached, and the completed assembly can accept inserted a printed signage or indicia affixed into the sign-holder or gripper. This arrangement allows for added versatility, as the signage can be simply taken out and put in upside down if the assembly's orientation is reversed. Alternatively, the tab-like attachment means can be adhered directly to the printed signage itself.

In another embodiment, the above assembly is a monolithic sign-holder or sign. In yet another embodiment, a right-angled shelf talker can be included in the assembly.

The holes for the elastic can be sealed or slotted holes. The elastic can be a simple elastic, a fabric type elastic, a spring, or the like. The elastic can be integrated onto the tab-like attachment by means other than holes, such as staples, glue, heat welding, heat staples, or any other mechanical or adhesive means.

The assembly can feature materials that it is suited for extreme heat or cold environments, such as shelves selling hot prepared meals, store freezers and the like.

The invention's elastic-like tensioned span allows for rapid placement and removal of the invention onto the ESL, as well as an unobstructed top border (which is present in U.S. Pat. No. 9,373,273), and self-correcting behavior if knocked while in use.

Furthermore, a variety of signs and devices can be integrally included, and/or attached to the invention. In addition to signage and communication materials, mechanical grippers, pincers, Velcro, magnets, perpendicular flags, and a host of other features and devices can be incorporated into and onto the invention's assembly to take advantage of the invention's ease and versatility of attachment to the ESL. The invention can be modified so that it can conform and match different ESL shapes and geometries, plus, for other non-ESL type store fixture.

A specific range of thickness of the material that works best is approximately 0.005" to 0.050", and the present invention can be made of printable media such as plastic, metal, or cardstock.

DETAILED DESCRIPTION OF THE PREFERRED EMBODIMENT

The present invention is a tab-like attachment or flag that affixes onto an Electronic Shelf Label (ESL) in a retail environment to draw attention of customers to a specific product that may be on Sale or Promotion. It can also be used to draw attention of store staff to communicate inventory status and other internal information relating to a specific product.

The invention can be installed and removed very quickly by store staff, and self-aligns to the ESL. Once installed, the invention is discreetly affixed to the ESL, and resists dislodging from its position by typical every-day store activities such as being bumped by a shopping cart or accidentally snagged by a passing-by customer or a store staff member.

Figure 1:
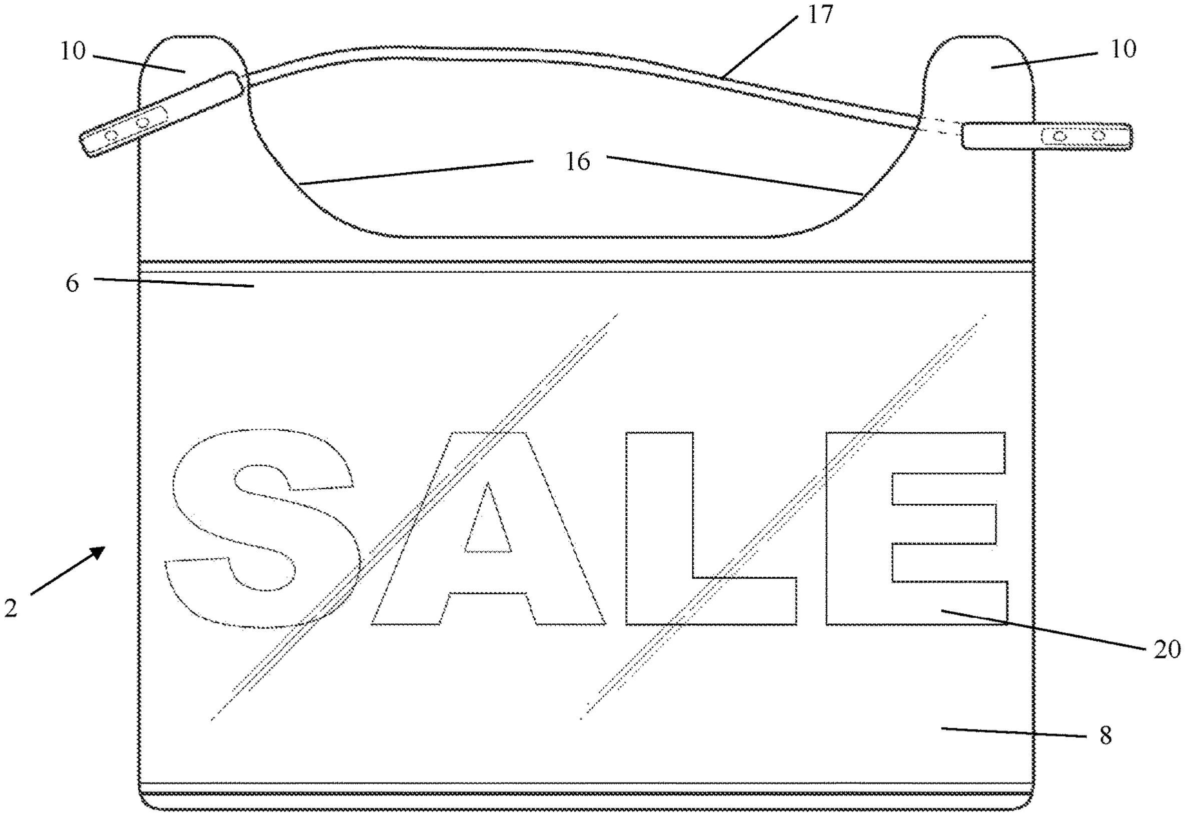
FIG. 1 shows a front view of an embodiment of the present invention with indicia.

Referring now to drawings, FIG. 1 shows the first preferred embodiment of the present invention, namely an ESL flag 2, comprising an upper portion 6 and lower portion 8. Upper portion 6 comprises two elongations 10 extending above upper portion 6's distal ends, each elongation 10 comprising curves 16 sloping downwards towards the middle of upper portion 6. Each elongation 10 comprises a hole 12 to accommodate an elastic tie retainer 19, and an elastic tie 18 spans both elongations 10. Lower portion 8 comprises a clear window for display of indicia 20. If elastic tie 17 or 18 should break or tear, it can be replaced with another elastic tie 17 or 18.

Figure 2:
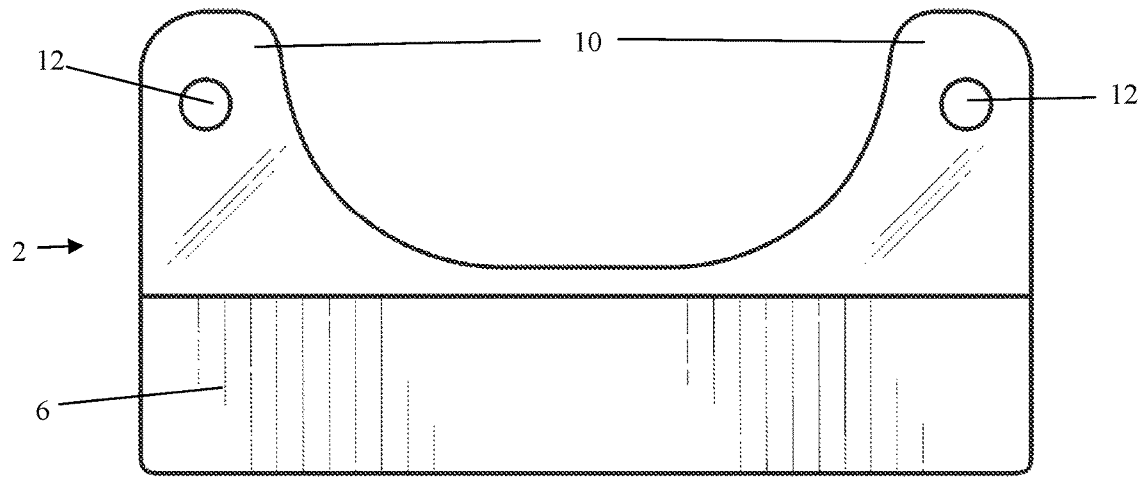
FIG. 2 shows a front view of another embodiment of the present invention with an adhesive strip without an elastic tie.
Figure 3:
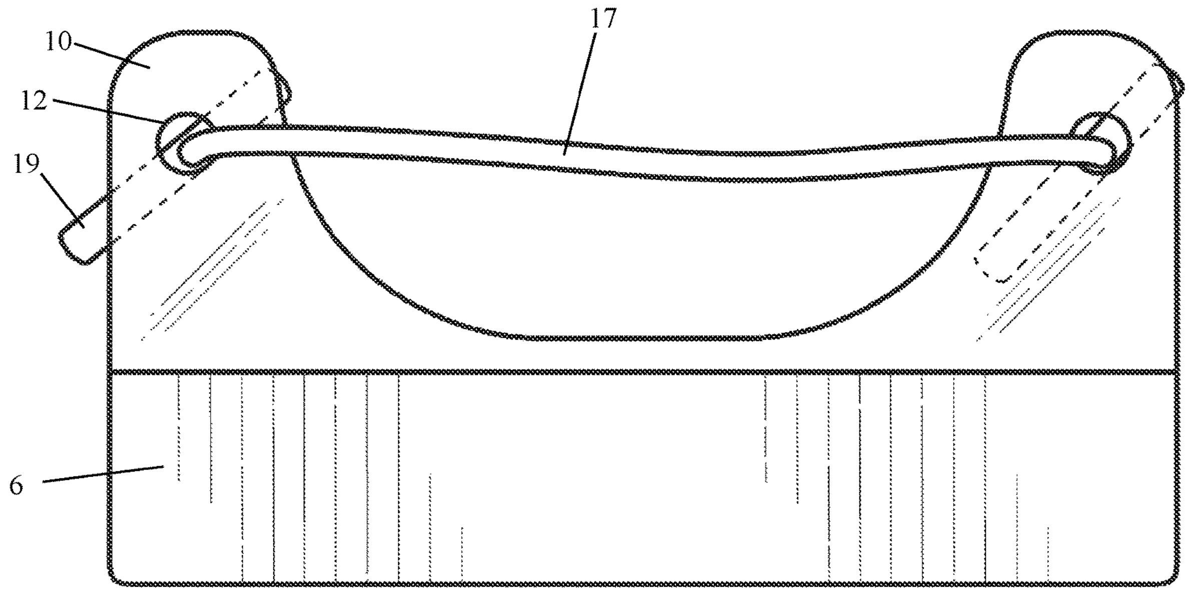
FIG. 3 shows FIG. 2 with an elastic tie.

FIG. 2 shows a second preferred embodiment of the present invention, wherein ESL flag 2 comprises only an upper portion 6 without lower portion 8, and wherein an adhesive strip is affixed onto upper portion 6. Adhesive strip 6 can accommodate any desirable indicia 20. FIG. 3 shows the second embodiment with an elastic tie 18 spanning elongations 10, wherein distal ends of elastic tie 17 are attached to retainers 19. Each retainer 19 is inserted into hole 12 to anchor elastic tie 17 into holes 12.

Figure 4:
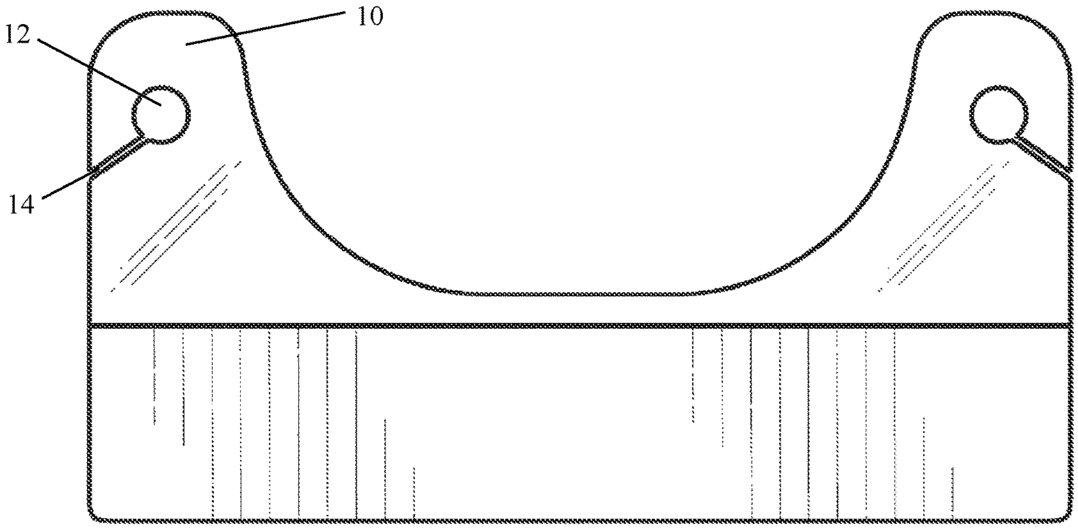
FIG. 4 shows another embodiment of FIG. 2 to accommodate an elastic band.
Figure 5:
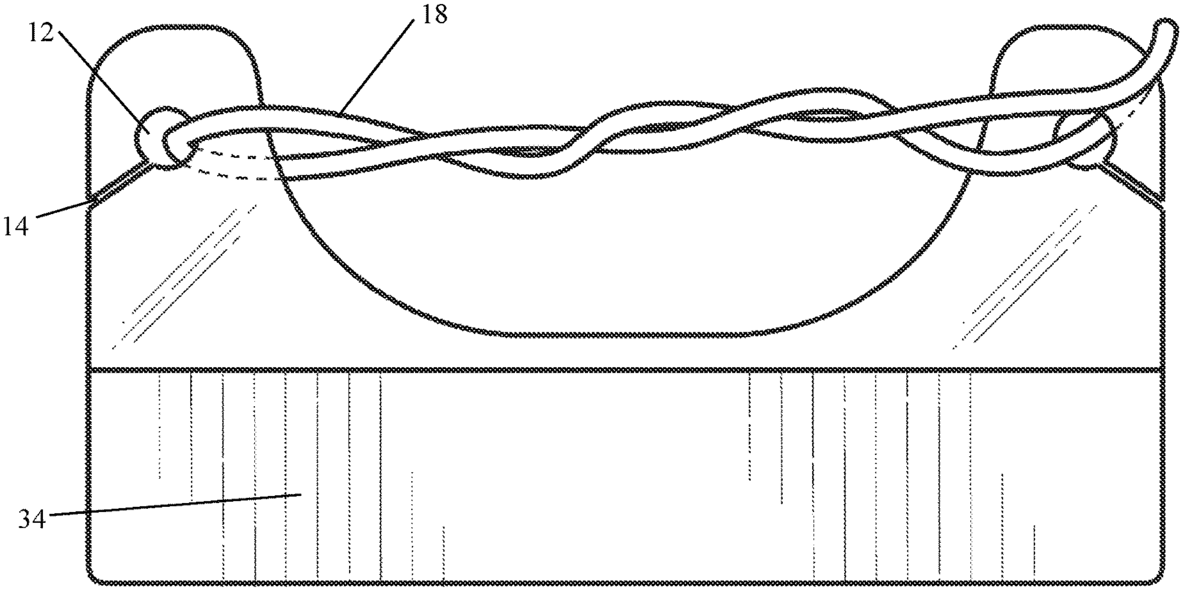
FIG. 5 shows FIG. 4 with an elastic band.

FIG. 4 shows a variant of the second preferred embodiment, wherein each hole 12 is accommodated with slit 14 running from hole 12 to each outer distal end of elongation 10 at an angle. As seen on FIG. 5, a standard elastic band 18 can be inserted into slits 14 and immobilized in holes 12.

Figure 6:
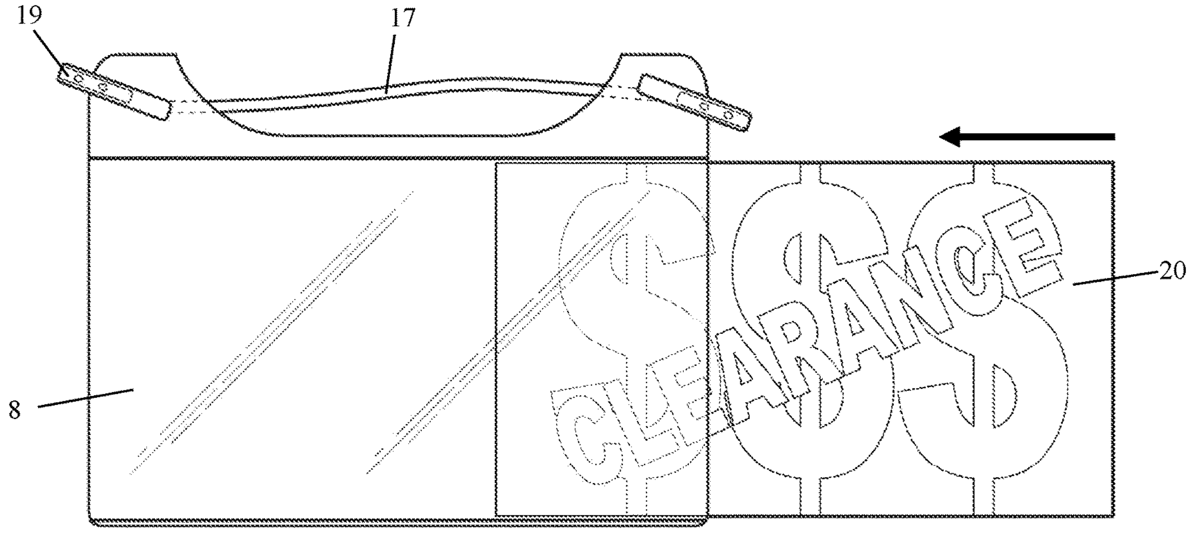
FIG. 6 shows FIG. 1 during insertion of indicia.

FIG. 6 shows installation of indicia 20 into lower portion 8's window. In the preferred embodiment, lower portion 8 can be either a clear envelope, sleeve, or another means to retain indicia 20 such as a flat C-shape in cross-section.

Figure 7:
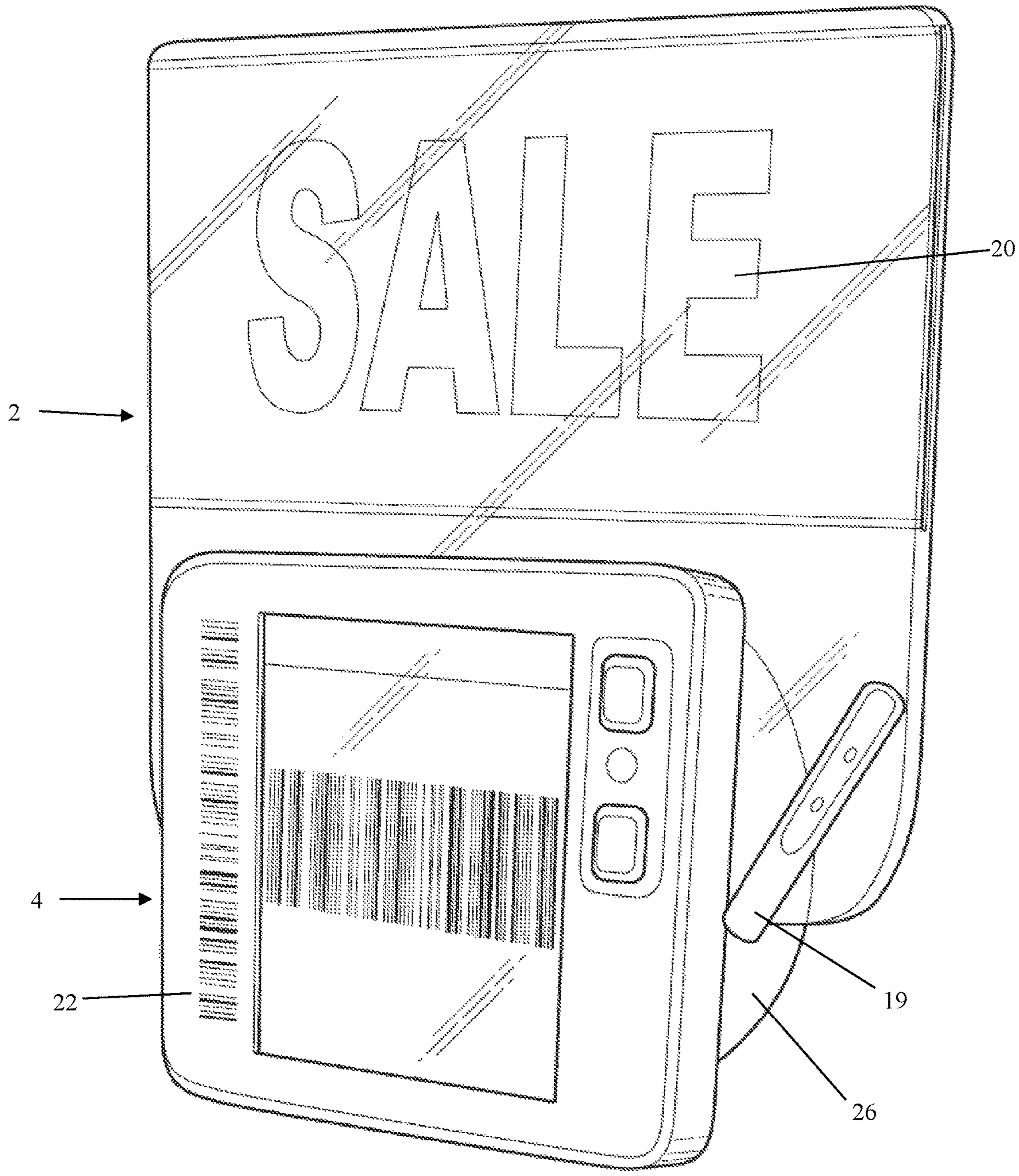
FIG. 7 shows the invention shown on FIG. 1 displayed above an Electronic Shelf Label ("ESL").
Figure 8:
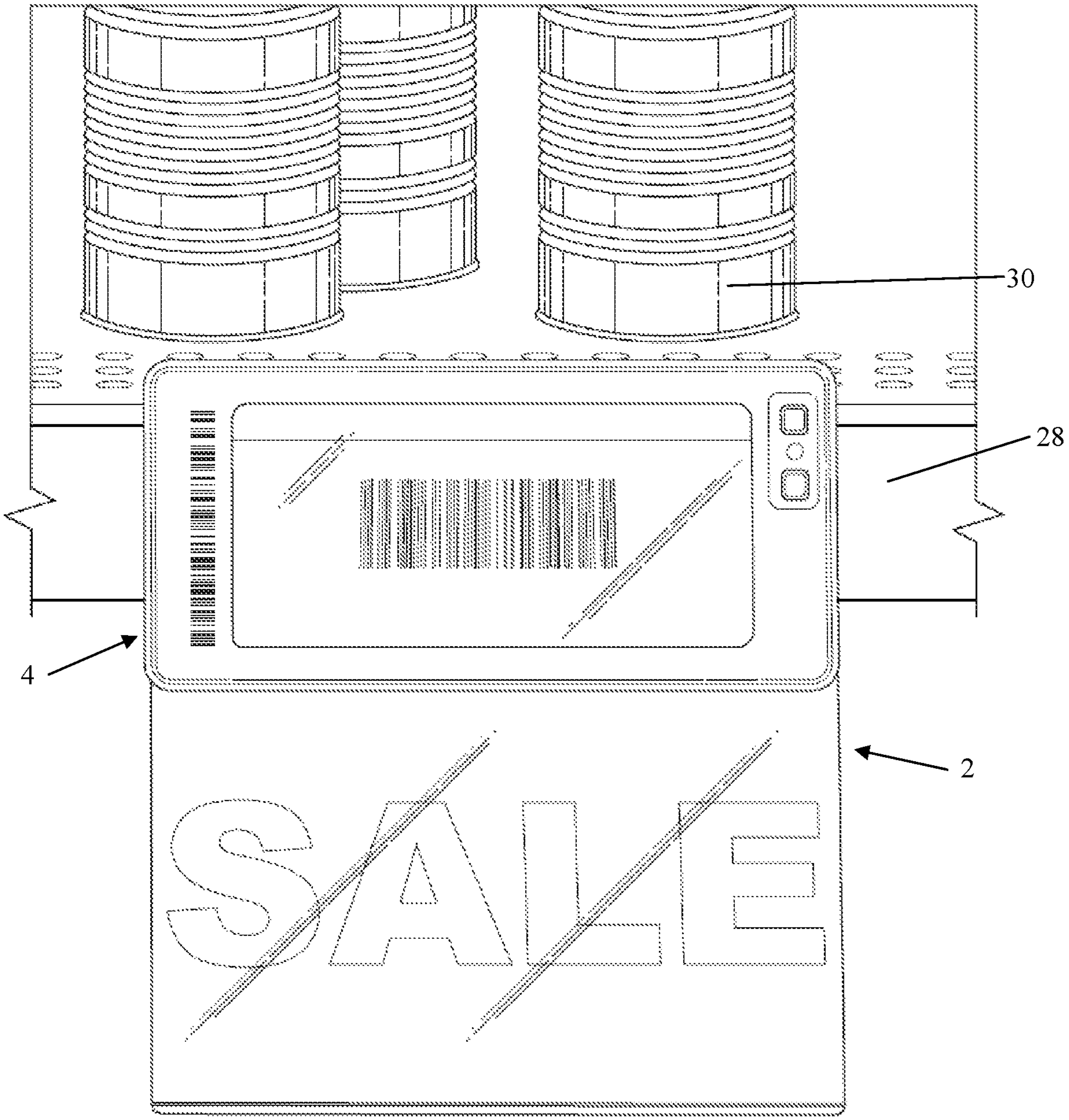
FIG. 8 shows the invention shown on FIG. 1 displayed below and ESL, with products on a shelf.

FIG. 7 demonstrates ESL flag 2 affixed on top of ESL 4, with indicia 20 displayed, clearly identifying which product 30, priced according to ESL's front 22, is on Sale. Contour 26 of ESL 4's housing 25 is also seen on FIG. 7. FIG. 8 shows flag 2 displayed below ESL 4, which is attached to shelf 28 holding products 30.

Figure 9:
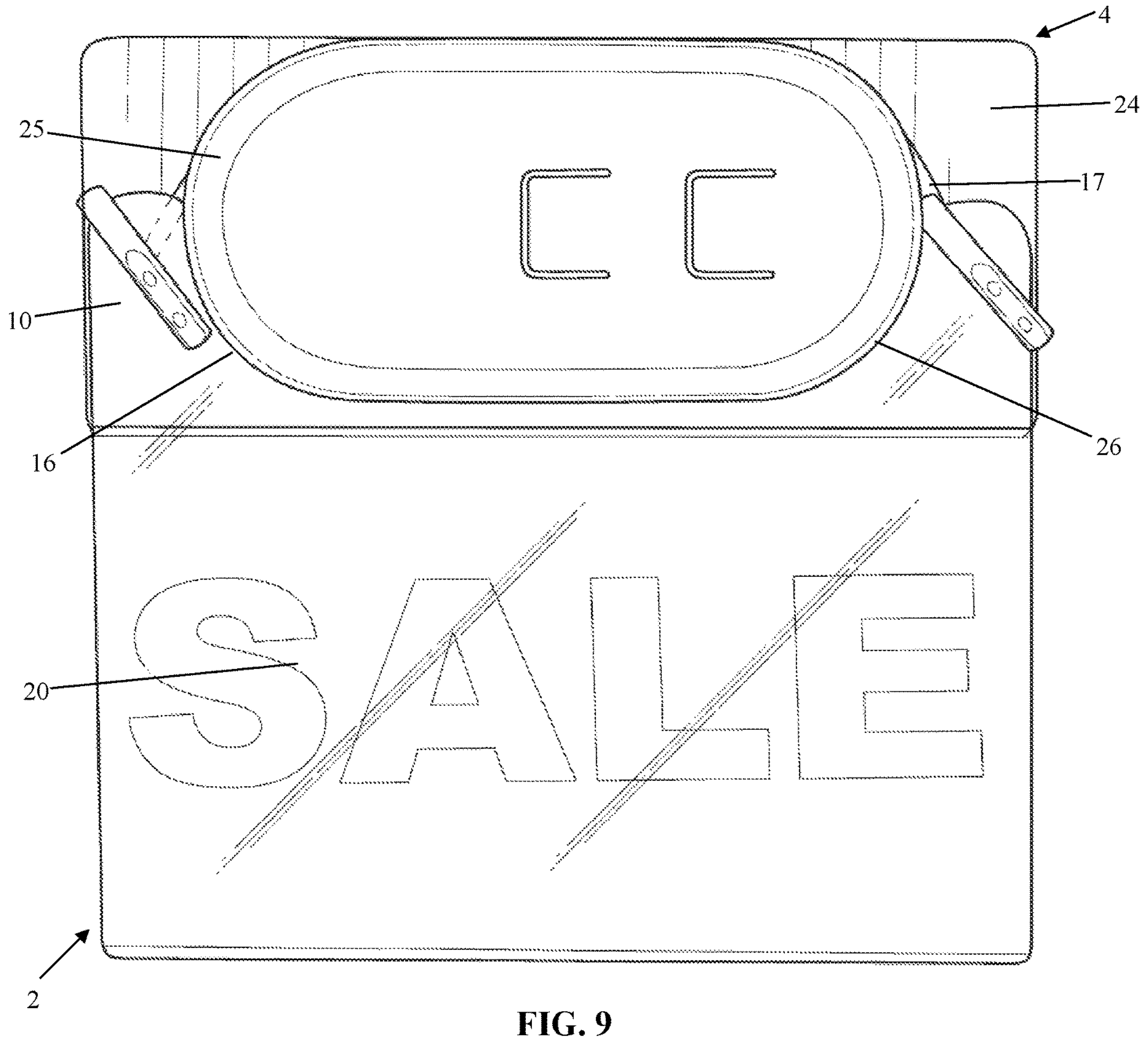
FIG. 9 shows a rear view of the invention shown on FIG. 1 attached to an ESL by an elastic tie.

FIG. 9 shows the rear view of ESL flag 2 attached to ESL 4. Housing 25, accommodating ESL 4's electronics, protrudes from ESL back 24, and its shape is a substantially elongated oval. Housing 25 comprises a contour 26 (as clearer seen on FIG. 7), and curves 16 of elongations 10 snugly mate with a portion of contour 26. Elastic tie 17 resiliently mates with the portion of contour 26 that is not mated to curves 16. Flag 2 can be oriented either above ESL 4 (FIG. 7) or below ESL 4 (FIG. 8), whereby contour 26 mates with curves 16 and elastic tie 17 equally snugly, irrespective of flag 2's orientation above or below ESL 4. In another model of ESL 4, (not shown) housing 25 is substantially rectangular, and curves 16 are substantially right angles to accommodate contour 26's rectangular shape. In cases where ESL 4's electronics are self-contained inside ESL body 4 without housing 25, flag 2 can be suspended off ESL 4's shelf mounting bracket (not shown).

Figure 10:
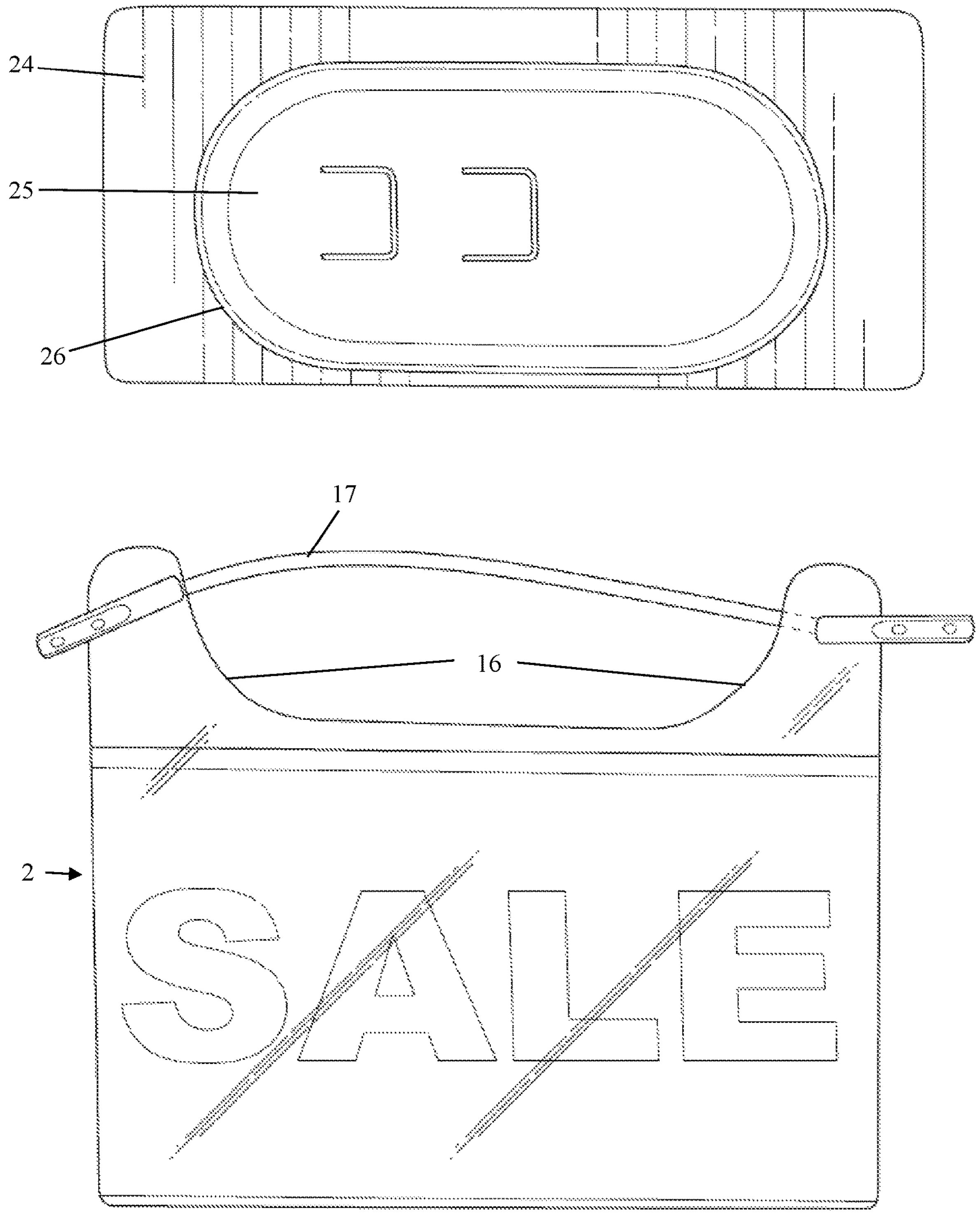
FIG. 10 shows the invention as seen on FIG. 9 prior to installation onto an ESL.

FIG. 10 demonstrates flag 2 prior to installation onto ESL 4. Curves 16 are substantially the shape of half of contour 26 of housing 25, which protrudes from ESL 4's back portion 24. Elastic tie 17 resiliently affixes flag 2 to the portion of housing 25's contour 26 that is not touching curves 16.

Figure 11:
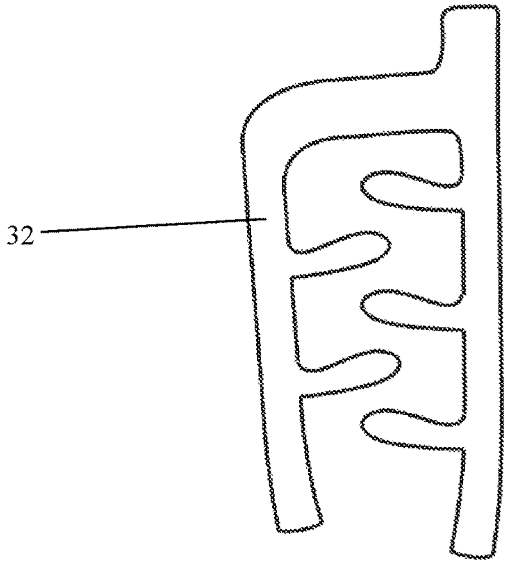
FIG. 11 shows a side view of a gripper used to hold indicia.
Figure 12:
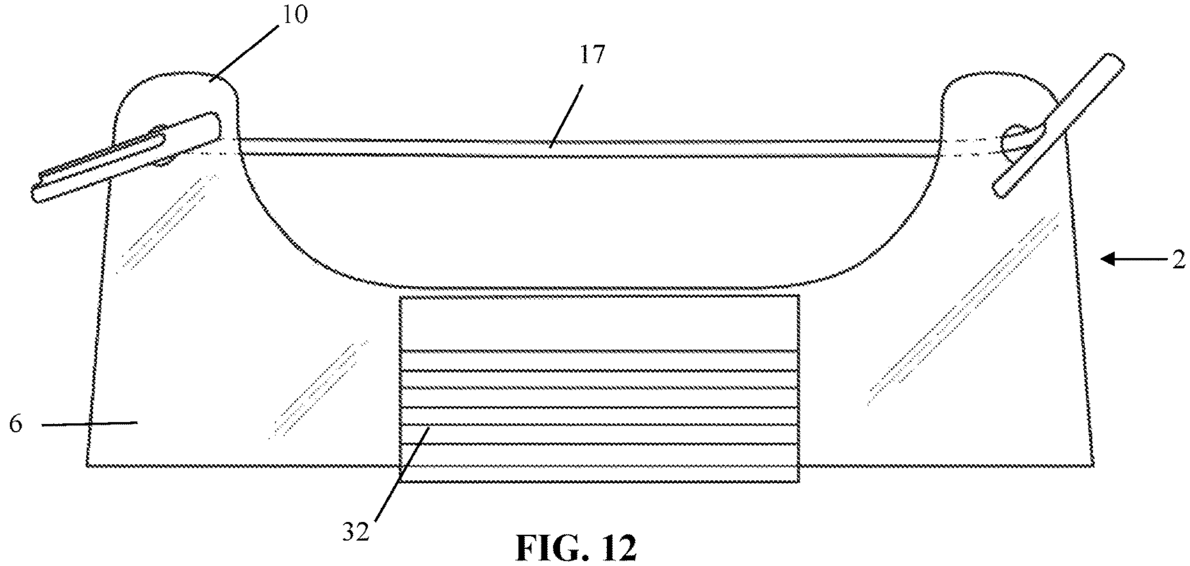
FIG. 12 shows the invention as seen on FIG. 3 with a gripper attached.

FIG. 11 is a side view of the second preferred embodiment's gripper 32, made of a resilient material with staggered teeth to hold indicia 20. Other variants of gripper 32 are possible. FIG. 12 demonstrates gripper 32 affixed substantially in the middle of upper portion 6 of flag 2. Gripper 32 can be held in place with adhesive or other means, or can be manufactured as an integrated monolithic structure with flag 2.

Figure 13:
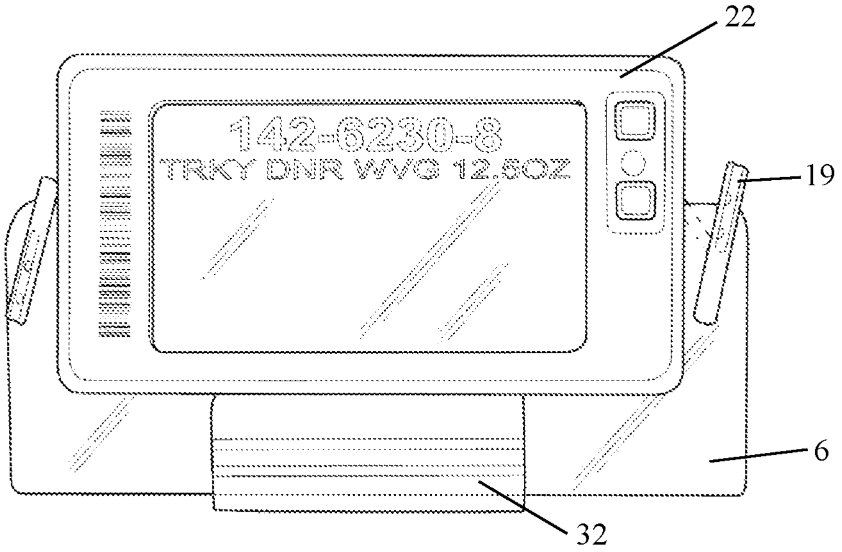
FIG. 13 shows the invention as seen on FIG. 12 attached to an ESL.
Figure 14:
FIG. 14 shows the invention as seen on FIG. 13 with indicia inserted into gripper.
Figure 15:
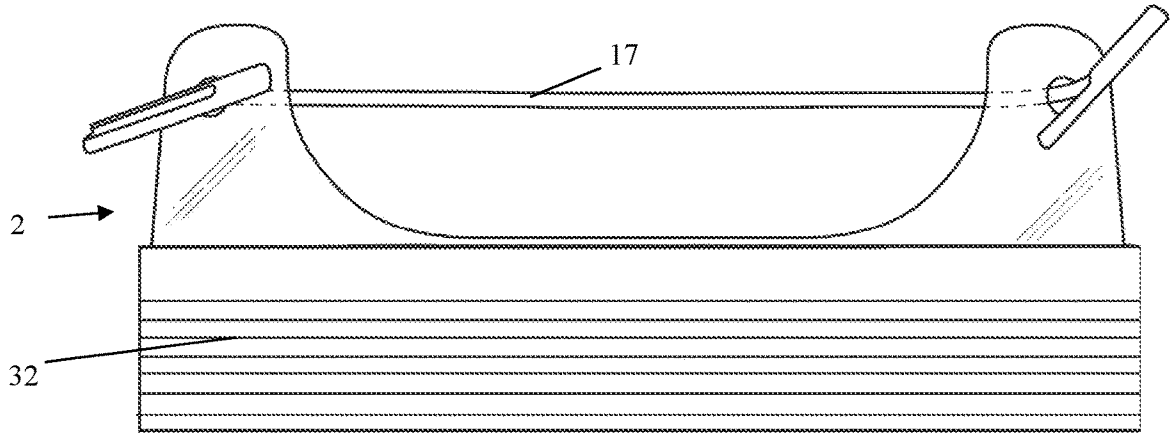
FIG. 15 shows the invention as seen on FIG. 3 with a longer gripper.

FIG. 13 shows the second preferred embodiment affixed to ESL 4, whose front 22 displays pricing information. FIG. 14 shows indicia 36, comprising a visual element that is larger than flag 2, attached to gripper 32, displayed below ESL 4's front 22. FIG. 15 shows a variant of the second preferred embodiment as disclosed on FIG. 12 with a longer gripper 32 on upper portion 6. Gripper 32 can be held in place with adhesive or other means, or can be manufactured as an integrated monolithic structure with flag 2.

Figure 16:
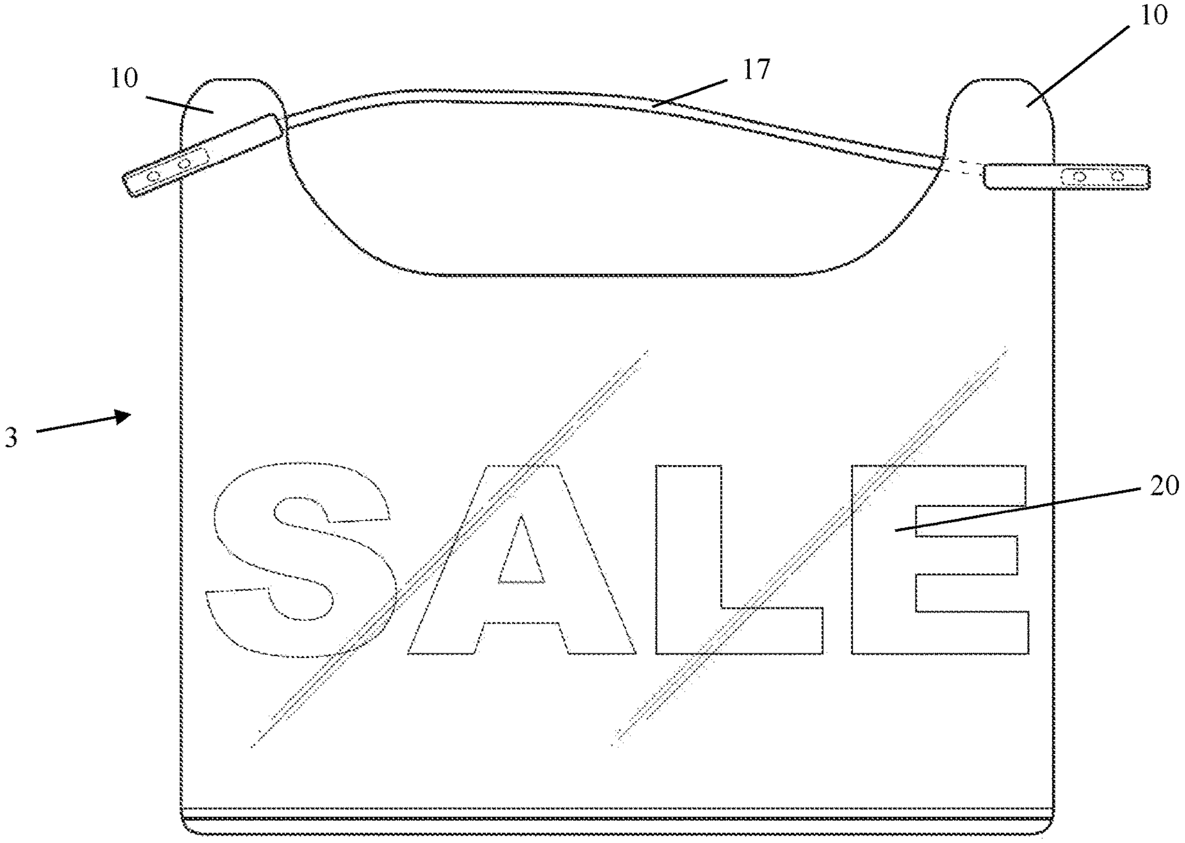
FIG. 16 shows a front view of a one-piece monolithic embodiment of the present invention.
Figure 17:
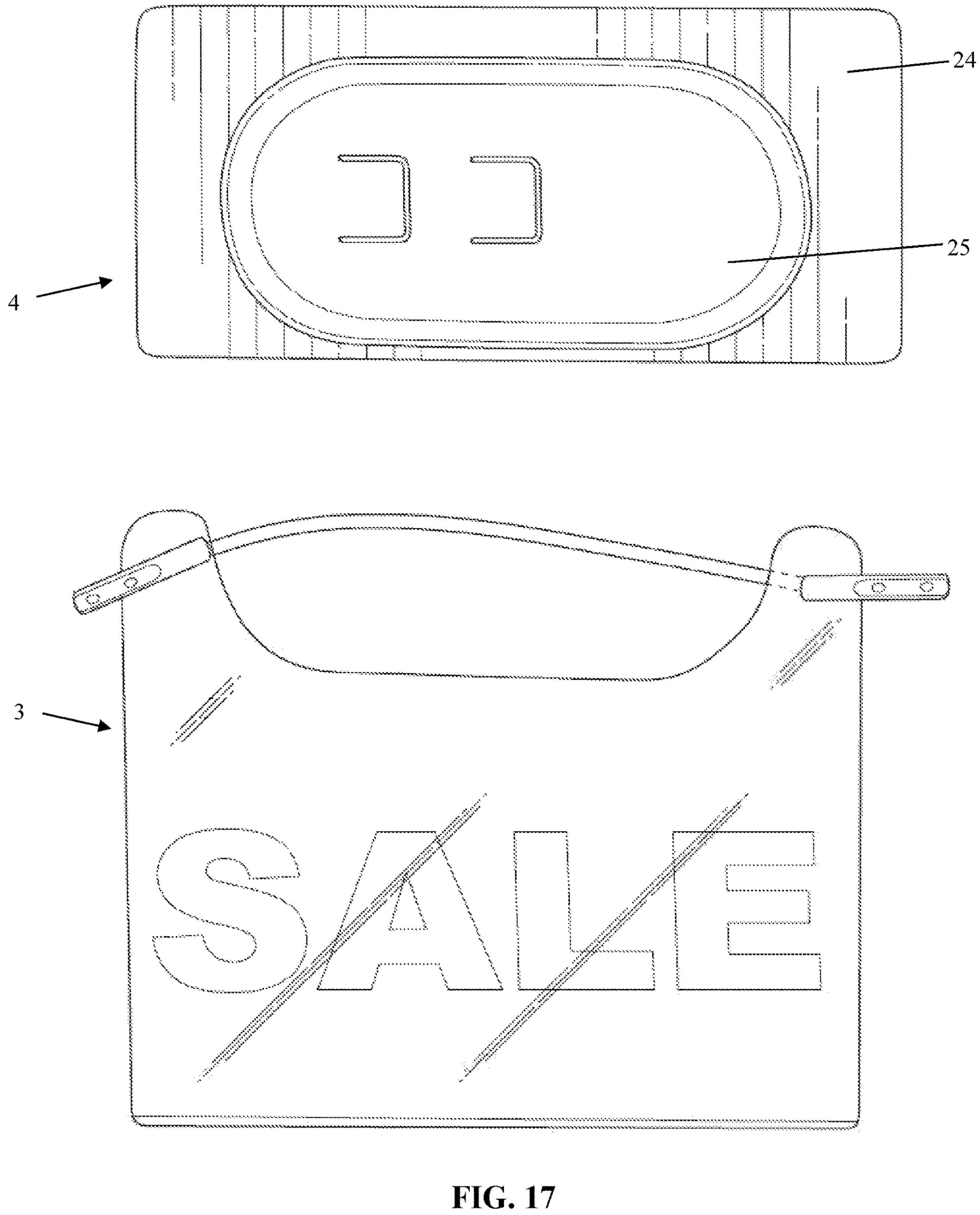
FIG. 17 shows a rear view of FIG. 16 prior to installation onto an ESL.

FIG. 16 shows a one-piece or monolithic embodiment of the present invention, wherein elongations 10, upper portion 6, and lower portion 8 are fused into one and monolithic element, displaying indicia 20. FIG. 17 shows the embodiment of FIG. 16 prior to installation onto housing 25 of ESL 4's back 24.

Figure 18:
FIG. 18 shows the invention shown on FIG. 7 with a shelf talker.

FIG. 18 shows the invention as displayed on FIG. 7 with a right-angle shelf talker 38.

Shelf talker 38 is at a right angle to indicia 20, so that it juts out into the store's aisle on the vertical plane away from shelf 28 (seen on FIG. 8) and makes eye contact with a passing-by shopper.

In practice, at the beginning of a promotional period, a store staff member will circulate throughout the store to find the products that are on Sale or being Promoted. This is usually done before the store opens to the public, and the relevant ESLs will be flashing to alert the staff member which items need to be flagged. The staff member will attach flag 2 to ESL 4 by stretching elastic tie 17 or band 18 past ESL front 22, until tie 17 or band 18 makes contact with contour 26. The staff member will then pull flag 2's upper portion 6 past ESL front 22 so that flag 2's curves 16 make contact and mate with ESL housing 25's contour 26.

Flag 2 will geometrically self-align itself to ESL 4 due to the snug relationship between contours 16 and contour 26, remaining in place due to elastic tie 17 or band 18. Upon correct installation, it is impossible for flag 2 to appear askew with ESL 4 due to snug mating of curves 16 and contour 26. Even if accidentally disturbed by a customer or cart, flag 2 will correctly coordinate with ESL 4 due to the snug mating of contours 16 and contour 26.

Removal of flag 2 is the reverse of installation: staff member pulls flag 2 away from ESL unseating curves 16 away from contour 26, and pulls elastic tie 17 or band 18 off ESL front 22.

As mentioned, different ESL models have different geometries of housing 25's contour 26. If contour 26 is rectangular or square, curves 16 must match the shape of contour 26. Depending on the ESL model, elongations 10 can be longer or shorter, and curves 16 can vary to accommodate contour 26 of ESL 4. It should be noted that the same ESL flag 2 can be used for ESLs that are 3.5" in width (large-face ESLs') and ESLs that are 2.75" in width (medium-face ESLs'), i.e. the same flag 2 is useful for ESLs ranging in size from 78% to 100%.

For the embodiment seen on FIGS. 11 to 15, a mechanical gripper 32 can be either adhered to upper portion 6's adhesive strip 34 (seen on FIG. 5), or mechanically fused to flag 2's upper portion 6 by heat welding or other methods. Indicia 36 is securely retained by gripper 32's teeth (seen on FIG. 11).

The embodiment shown on FIGS. 16 and 17 comprises a one-piece flag 3, wherein all essential parts are manufactured out of one piece of material, namely elongations 10, upper portion 6 and lower portion 8, all comprise a unitary body.

FIG. 18 shows a shelf talker 38 forming an extension of insignia 20. Shelf talker 38 folds on the vertical plane outwardly from shelf front 28 in order to be spotted by a shopper walking straight down a store's aisle rather than facing shelf front 28.

It is an important feature of the present invention that flag 2 has a resilient member such as elastic tie 17 or band 18 to facilitate quick installation/removal and self-correcting characteristics. Any resilient member can be substituted for elastic tie 17 or band 18, such as a spring. Flag 2 can be mounted either above, below, or on the side of ESL 4.

The invention claimed is:

1. A retail signage attachment assembly for an electronic shelf label ("ESL"), wherein said ESL comprises a front portion that displays information and a rear portion that houses said ESL's electronics, wherein said ESL's rear portion's dimensions are lesser than said front portion's dimensions, wherein said retail signage attachment assembly comprises an upper and a lower portion two elongations extending from said upper portion, said elongations adapted to partially contour a bottom edge of said rear portion of an electronic shelf label ("ESL")

an elastic element mounted into said elongations, said elastic element adapted to be looped over a top edge of said rear portion of said ESL, wherein said lower portion of said retail attachment assembly is adapted to display indicia, and wherein said retail signage attachment assembly resists dislodgement from said ESL, and is adapted towards self-correcting to maintain intended orientation with said ESL, in case of impact or disturbance.

2. A retail signage attachment assembly according to claim 1, wherein said upper portion comprises an adhesive strip.

3. A retail signage attachment assembly according to claim 1, wherein said lower portion comprises an adhesive strip.

4. A retail signage attachment assembly according to claim 1, wherein said lower portion comprises a right-angle shelf talker.

5. A retail signage attachment assembly according to claim 1, wherein said elastic elements are mounted into said elongations through sealed holes in said elongations.

6. A retail signage attachment assembly according to claim 1, wherein said elastic elements are mounted into said elongations through slotted holes in said elongations.

7. A retail signage attachment assembly according to claim 1, wherein said upper portion comprises a mechanical gripper for retail indicia.

8. A retail signage attachment assembly according to claim 1, wherein said assembly can be displayed above an ESL.

9. A retail signage attachment assembly according to claim 1, wherein said assembly can be displayed below an ESL.

10. A retail signage attachment assembly according to claim 1, wherein said lower portion comprises a sleeve for accepting said indicia.

11. A retail signage attachment assembly according to claim 1, wherein said assembly is made of a material suited to withstand extreme heat and cold environments.

12. A retail signage attachment assembly according to claim 11, wherein said material is printable media.

13. A retail signage attachment assembly according to claim 11, wherein a thickness of said material is between 0.005" and 0.050".

14. A retail signage attachment assembly for an electronic shelf label ("ESL")

wherein said ESL comprises a front portion that displays information and a rear portion that houses said ESL's electronics, wherein said ESL's rear portion's dimensions are lesser than said front portion's dimensions, wherein said retail signage attachment assembly comprises an upper and lower portion two elongations extending from said upper portion, said elongations adapted to partially contour a bottom edge of said rear portion of said ESL a replaceable elastic element mounted into said elongations, said elastic element adapted to be looped over a top edge of said rear portion of said ESL, wherein said lower portion of said retail attachment assembly is adapted to display indicia, and wherein said retail signage attachment assembly resists dislodgement from said ESL, and is adapted to self-correct to maintain intended orientation with said ESL, in case of impact or disturbance.

* * * * *